(12) United States Patent
Hu et al.

(10) Patent No.: US 12,468,703 B2
(45) Date of Patent: Nov. 11, 2025

(54) DATA READING AND WRITING METHOD, ELECTRONIC DEVICE AND MEDIUM

(71) Applicant: Beijing Volcano Engine Technology Co., Ltd., Beijing (CN)

(72) Inventors: Leilei Hu, Beijing (CN); Kejian Ju, Beijing (CN); Zhaowei Huang, Beijing (CN); Junling Du, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/827,533

(22) Filed: Sep. 6, 2024

(65) Prior Publication Data
US 2025/0124032 A1 Apr. 17, 2025

(30) Foreign Application Priority Data
Oct. 11, 2023 (CN) .......................... 202311317394.9

(51) Int. Cl.
*G06F 16/2453* (2019.01)
*G06F 16/22* (2019.01)
*G06F 16/23* (2019.01)
*G06F 16/25* (2019.01)

(52) U.S. Cl.
CPC ...... *G06F 16/24542* (2019.01); *G06F 16/221* (2019.01); *G06F 16/2379* (2019.01); *G06F 16/258* (2019.01)

(58) Field of Classification Search
CPC ............. G06F 16/24542; G06F 16/221; G06F 16/2379; G06F 16/258
See application file for complete search history.

(56) References Cited

U.S. PATENT DOCUMENTS

| | | | | |
|---|---|---|---|---|
| 6,636,861 B1 * | 10/2003 | Stack | .................. | G06F 16/258 |
| | | | | 709/219 |
| 8,918,436 B2 * | 12/2014 | Yoon | .................. | G06F 16/9535 |
| | | | | 707/963 |
| 2003/0028509 A1 * | 2/2003 | Sah | .................. | G06F 16/284 |
| 2009/0210445 A1 * | 8/2009 | Draese | .................. | G06F 16/221 |
| 2009/0254532 A1 * | 10/2009 | Yang | .................. | G06F 16/221 |

(Continued)

FOREIGN PATENT DOCUMENTS

| | | |
|---|---|---|
| CN | 103177046 A | 6/2013 |
| CN | 103810219 A | 5/2014 |
| CN | 111858759 A | 10/2020 |

*Primary Examiner* — Cheyne D Ly
(74) *Attorney, Agent, or Firm* — BakerHostetler

(57) ABSTRACT

A data reading and writing method, apparatus and electronic device are provided. In one embodiment, the method includes: receiving a data reading and writing request for a first database, wherein the first database stores data in a column-oriented storage format, the data reading and writing request is used for reading/writing data from/into a row storage table, the first database includes a front-end node and a back-end node, the front-end node is used for receiving the data reading and writing request and the back-end node is used for storing data; parsing the data reading and writing request in the front-end node and sending a parsing result to the back-end node; and reading/writing data from/into a second database by using the parsing result in the back-end node, wherein the first database calls data from the second database, and the second database stores data in a row-oriented storage format.

20 Claims, 6 Drawing Sheets

500

501
Parse, in the front-end node, the data reading and writing request to generate a physical execution plan, split the physical execution plan into a plurality of plan fragments, build a fragment instance according to the plurality of plan fragments, and send the fragment instance to the back-end node 502
Process, in the back-end node, the fragment instance by adopting a pipeline link, read data from the second database by using the start operator, and write data into the second database by using the end operator

(56) References Cited

U.S. PATENT DOCUMENTS

| | | | |
|---|---|---|---|
| 2010/0205351 A1* | 8/2010 | Wiener | G06F 12/0246 |
| | | | 711/216 |
| 2011/0016157 A1* | 1/2011 | Bear | G06F 16/22 |
| | | | 707/804 |
| 2012/0254252 A1* | 10/2012 | Jin | G06F 16/283 |
| | | | 707/E17.054 |
| 2014/0012881 A1* | 1/2014 | Roesch | G06F 16/217 |
| | | | 707/792 |
| 2016/0253382 A1* | 9/2016 | Shadmon | G06F 16/2453 |
| | | | 707/718 |
| 2017/0116237 A1* | 4/2017 | Zhang | G06F 16/221 |
| 2017/0344441 A1* | 11/2017 | Horowitz | G06F 3/0673 |
| 2018/0144004 A1* | 5/2018 | Bedi | G06F 16/2453 |
| 2021/0034586 A1* | 2/2021 | Arye | G06F 16/24539 |
| 2023/0141902 A1* | 5/2023 | Ma | G06F 16/24552 |
| | | | 707/718 |

* cited by examiner

500

| 501 |
| --- |
| Parse, in the front-end node, the data reading and writing request to generate a physical execution plan, split the physical execution plan into a plurality of plan fragments, build a fragment instance according to the plurality of plan fragments, and send the fragment instance to the back-end node |

| 502 |
| --- |
| Process, in the back-end node, the fragment instance by adopting a pipeline link, read data from the second database by using the start operator, and write data into the second database by using the end operator |

Fig. 5

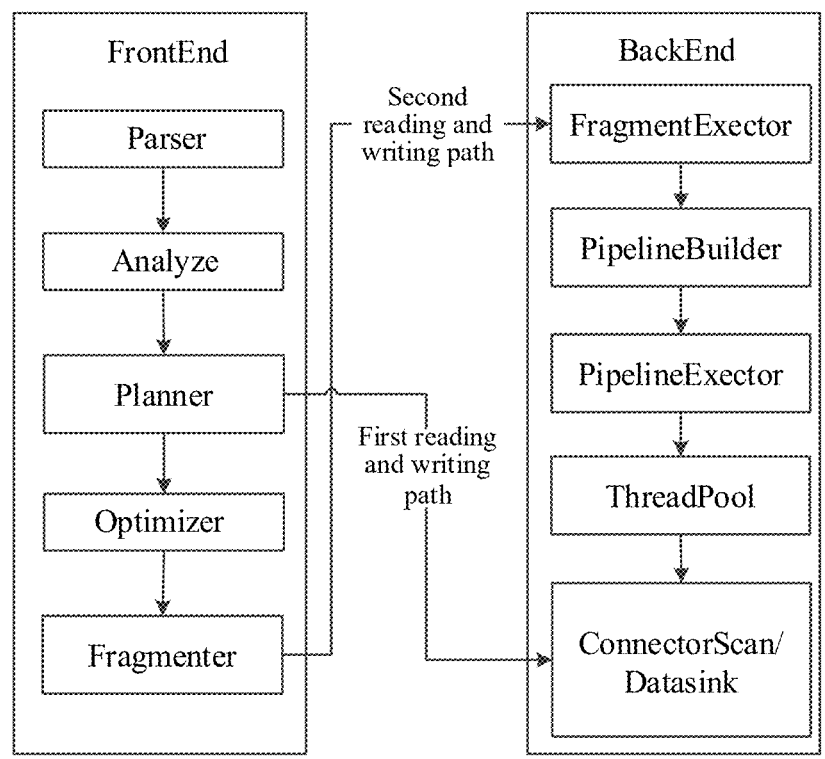

Fig. 6

DATA READING AND WRITING METHOD, ELECTRONIC DEVICE AND MEDIUM

CROSS-REFERENCE TO RELATED APPLICATION

This application claims the priority to and benefits of the Chinese Patent Application, No. CN202311317394.9, which was filed on Oct. 11, 2023. The aforementioned patent application is hereby incorporated by reference in its entirety.

TECHNICAL FIELD

Embodiments of the present disclosure relates to the technical field of computer techniques, and in particular to a data reading and writing method, apparatus, electronic device and medium.

BACKGROUND

As one of main applications of a data warehouse system, an On-line Analytical Processing (OLAP) system can be used for supporting complicated analysis operations, emphasizing decision support for decision maker and senior manager, quickly and flexibly performing complicated query processing of large data volumes according to the requirements of an analyst, and providing query results to the decision maker. However, in addition to real-time warehouse requirements, OLAP clients also want the OLAP system to have highly-concurrent point query and high-frequency updating capacities, while existing data warehouses that store data in a column-oriented storage format cannot meet the above requirements of the OLAP clients.

SUMMARY

The present disclosure section is provided to introduce concepts in a simplified form, which will be described in detail in the detailed description section later. The present disclosure section is not intended to identify key features or essential features of the claimed technical solution, nor is it intended to limit the scope of the claimed technical solution.

In a first aspect, embodiments of the present disclosure provide a data reading and writing method, comprising: receiving a data reading and writing request for a first database, wherein the first database stores data in a column-oriented storage format, the data reading and writing request is used for reading/writing data from/into a row storage table, the first database comprises a front-end node and a back-end node, the front-end node is used for receiving the data reading and writing request and the back-end node is used for storing data; parsing the data reading and writing request in the front-end node and sending a parsing result to the back-end node; and reading/writing data from/into a second database by using the parsing result in the back-end node, wherein the first database calls data from the second database, and the second database stores data in a row-oriented storage format.

In a second aspect, embodiments of the present disclosure provide a data reading and writing apparatus, comprising: a receiving unit configured to receive a data reading and writing request for a first database, where the first database stores data in a column-oriented storage format, the data reading and writing request is used for reading/writing data from/into a row storage table, the first database includes a front-end node and a back-end node, the front-end node is used for receiving the data reading and writing request and the back-end node is used for storing data; a sending unit configured to parse the data reading and writing request in the front-end node and send a parsing result to the back-end node; and a reading and writing unit configured to read/write data from/into a second database by using the parsing result in the back-end node, where the first database calls data from the second database, and the second database stores data in a row-oriented storage format.

In a third aspect, embodiments of the present disclosure provide an electronic device, comprising: one or more processors; and a storage unit with one or more programs stored thereon. The one or more programs, when executed by the one or more processors, cause the one or more processors to implement the method as described in the first aspect.

In a fourth aspect, embodiments of the present disclosure provide a computer-readable medium having stored thereon a computer program which, when executed by a processor, cause the processor to implement the method as described in the first aspect.

BRIEF DESCRIPTION OF DRAWINGS

The above and other features, advantages, and aspects of the embodiments of the present disclosure will become more apparent by reference to the accompanying drawings and the following detailed description of embodiments. Throughout the drawings, like or same reference numerals indicate like or same elements. It should be understood that the drawings are schematic, and the components and elements are not necessarily drawn to scale.

FIG. 5 is a flowchart of one embodiment of a second reading and writing path in the data reading and writing method according to the present disclosure;

FIG. 6 is a schematic diagram of the first reading and writing path and the second reading and writing path in the data reading and writing method according to the present disclosure;

DETAILED DESCRIPTION

Figure 1:
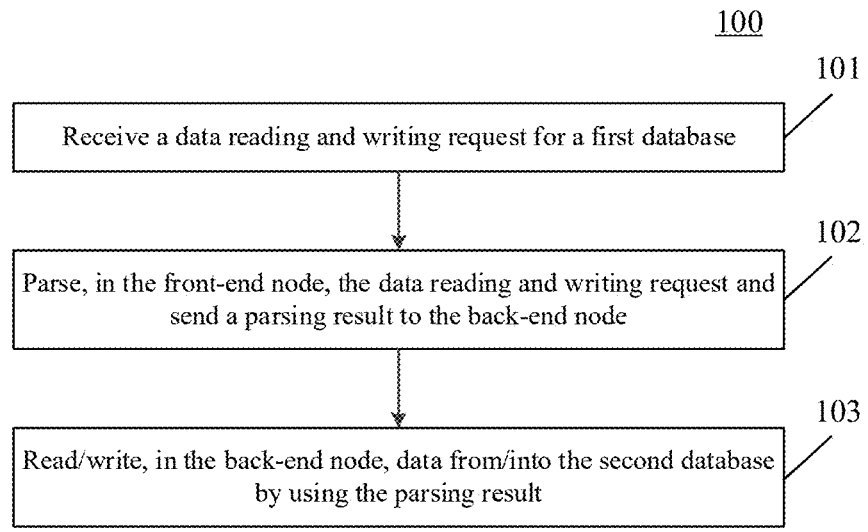
FIG. 1 is a flowchart of one embodiment of a data reading and writing method according to the present disclosure.

A more detailed description of the embodiments of the present disclosure will be provided hereinbelow, with reference to the drawings. Although certain embodiments of the disclosure are illustrated in the drawings, it should be understood that the disclosure can be realized in various forms and should not be interpreted as being restricted to the embodiments described herein; instead, these embodiments are provided to ensure that the disclosure is comprehensive and thorough, conveying its full extent to those skilled in the relevant art. It should be noted that the drawings and embodiments of the disclosure are provided solely for illustrative purposes and are not intended to limit the scope of protection of the disclosure.

It should be understood that in the method embodiments of the present disclosure, the various steps documented may be carried out in a different sequence and/or concurrently. Moreover, the method embodiments might encompass supplementary steps and/or omit the execution of some depicted steps. The scope of the present disclosure is not constrained in this aspect.

The term "including" and its variations used herein are open-ended terms, meaning "including but not limited to." The term "based on" signifies "at least partially based on." The expression "one embodiment" denotes "at least one embodiment"; the expression "another embodiment" denotes "at least one additional embodiment"; and the expression "some embodiments" denotes "at least some embodiments." Definitions for other related terms will be given in the descriptions that follow.

It is important to note that in the present disclosure, the terms such as "first" and "second" are used merely for the purpose of differentiating among various devices, modules, or units, and do not indicate any sequence or dependency relationship of the functions carried out by these devices, modules, or units.

It is also important to note that modifiers "a" and "multiple" as used in the present disclosure are indicative rather than limiting. One skilled in the art should understand that, unless clearly indicated otherwise in the context, these terms should be taken to mean "one or more."

The names or identifiers of messages or information exchanged between multiple devices in the embodiments of the present disclosure serve only for descriptive purposes and are not meant to confine the scope of these messages or information.

With reference to FIG. 1, it shows a flowchart 100 of one embodiment of a data reading and writing method according to the present disclosure. The data reading and writing method includes the steps as follows.

In step 101, a data reading and writing request for a first database is received.

In this embodiment, an executing entity of the data reading and writing method can receive the data reading and writing request for the first database. Here, the first database usually stores data in a column-oriented storage format, and the data reading and writing request is usually used to read/write data from/into a row storage table. The data reading and writing request is usually a structured query language (SQL) statement. SQL is a database language with multiple functions such as data manipulation and data definition. This language has interactive characteristics and can provide great convenience for users. A database management system should make full use of the SQL language to improve the working quality and efficiency of a computer application system.

Here, the first database generally includes a frontend (FE) node and a backend (BE) node. The front-end node is usually used to receive the data reading and writing request. Besides, the front-end node may also be used to manage metadata, manage client connections, perform query analysis planning, generate a query execution plan, perform query scheduling (issuing queries to the BE for execution) and etc. The data of the first database is usually stored in the back-end node. Besides, the back-end node may also be used to query the execution of the query execution plan, manage copies and etc.

The first database may be Doris. Doris is a distributed column-oriented storage and analysis system that supports real-time query and analysis.

A column storage table (that is, a column-oriented storage format) is used for data storage, which is suitable for the insertion of batch and bulk data at one time, statistical analysis queries (for example, group and join multi-scenarios), and ad-hoc queries (scenarios where query conditions are not certain and the row storage cannot determine an index), thus providing a superior data compression ratio and better indexing performance.

The row storage table (that is, a row-oriented storage format) is used for data storage, which is suitable for scenarios where data is frequently updated, scenarios with more point queries (simple queries based on indexes with few records returned) or more additions, deletions and changes, thus providing better point updates and point queries.

As an example, the user may create the row storage table or write data into an existing row storage table, and the user needs to specify an engine (i.e., a database) as row storage, that is, ENGINE=ROW_STORE. At this time, the executing entity can determine to write data into the row storage table from the received data writing request, and then, after encoding the data, can store the data in the second database that stores data in the row-oriented storage format.

In step 102, in the front-end node, the data reading and writing request is parsed and a parsing result is sent to the back-end node.

In this embodiment, the executing entity can parse the data reading and writing request in the front-end node of the first database and send the parsing result to the back-end node of the first database.

The front-end node can analyze the data reading and writing request, determine a storage location of the data read/written by the data reading and writing request in a data table of the back-end node and generate a data query task, and can send the storage location of data and the data query task to the back-end node.

In step 103, in the back-end node, data is read/written from/into the second database by using the parsing result.

In this embodiment, the executing entity can read/write data from/into the second database by using the parsing result in the back-end node. After receiving the storage location of data and the data query task, the back-end node can perform the data query task, acquire data from the corresponding storage location of the second database for data reading and writing, and can also analyze the read data.

Here, the second database usually stores data in the row-oriented storage format. The second database may include but not limited to at least one of: HBase, a Key-Value database. HBase is a distributed, column-oriented open source database and a distributed storage system of structured data. The Key-Value database is a database based on key-value pair storage, in which data search and storage are completed by a key-value method.

Here, the first database can call data from the second database, and the second database can provide an additional data storage layer for the first database.

According to the method provided by the embodiment of the present disclosure, by receiving the data reading and writing request for the first database that stores data in the column-oriented storage format, data is read/written from/ into the second database that stores data in the row storage format, so that the row-oriented storage capacity can be achieved in the column-oriented storage database, and the highly-concurrent point query and high-frequency updating capacities can be met.

In some alternative implementations, the executing entity can parse the data reading and writing request in the following ways. The executing entity may determine a request type of the data reading and writing request, and then determine a reading and writing path for the front-end node and the back-end node to read/write data from/into the second database based on the request type of the data reading and writing request. A corresponding relationship between the request type and the reading and writing path can be stored in the executing entity, and after the request type is determined, the data can be read/written from/into the second database by using the reading and writing path corresponding to the request type. In this way, the corresponding reading and writing path can be selected according to the request type to read and write data, which improves the flexibility of data reading and writing.

In some alternative implementations, the first database may include: a massively parallel processing (MPP) database. As an example, the first database may be StarRocks. StarRocks is a new generation of topspeed full-scenario MPP database. The vision of StarRocks is to make data analysis of the user easier and more agile. The user can use StarRocks to support topspeed analysis of various data analysis scenarios without complicated preprocessing. Star-Rocks has a simple architecture, adopts an omni-directional quantization engine, and is equipped with a newly designed cost based optimizer (CBO), and a query speed (e.g., multi-table correlated query) far exceeds that of similar products. StarRocks can well support real-time data analysis and implement efficient query of real-time updated data. Star-Rocks also supports modern materialized views to further speed up queries. With StarRocks, the user can flexibly build various models including a wide table, a star model and a snowflake model. StarRocks is compatible with MySQL (open source relational database management system) protocol, supports a standard SQL syntax, and makes it easy to be interfaced for use. StarRocks has no external dependencies, boasts high availability and is straightforward to operate and maintain.

The second database may include: a distributed transactional key-value database. As an example, the second database can be TiKV. TiKV is a highly extensible, low-latency and easy-to-use key-value database.

The use of StarRocks can meet the needs of the user to build a real-time data warehouse, and the data analysis ability can also get second-level response. However, Star-Rock adopts the column-oriented storage format for data storage, which leads to StarRocks' inability to meet the requirements of highly-concurrent point query and high-frequency updating capacities. The solution described in this embodiment uses StarRocks to call the data in TiKV to implement row-oriented data reading and writing, so as to achieve the row-oriented storage capacity in the StarRocks database and meet the highly-concurrent point query and high-frequency updating capacities. In addition, using the TiKV database to implement the row-oriented storage capacity can reduce the cost and improve the usability.

In some alternative implementations, since TiKV is composed of two fields, i.e., key and value, it is necessary to encode the table data in the data reading and writing request, convert it into the Key-Value field and store it in TiKV. Here, the key in the second database may include at least one of: a fixed prefix, a data fragment identity, an underline and data column data. The fixed prefix can be set by configuration items to distinguish between different clusters. When multiple StarRocks clusters share one TiKV, the StarRocks from which the data originates can be distinguished by the fixed prefix. The data fragment identity (table_id) is usually 4 bytes. The underline is used to facilitate decoding and interpretation of data. The table data in StarRocks is composed of data of multiple columns, several columns of which are encoded as the above data column data. The data column data can be divided by type, and a string type can be divided by a separator.

The value in the second database may include at least one of: a version, a column size, a null column size, a null column index array and data column data. The version number usually refers to the version number of TiKV, usually 4 bytes, for subsequent compatibility. The column size (Col_size) is usually 4 bytes, which is used for processing when the data storage is inconsistent with Schema (collection of database objects). The null column size (null_col_size) is usually 4 bytes, which is used for indicating a length of subsequent null column index array (null col index array). The null column index array is usually a variable-length data structure, which is encoded by a continuous integer (int), and a single int is 4 bytes. The table data in StarRocks is composed of data of multiple columns, several columns of which are encoded as the above data column data. The data column data can be divided by type, and a string type can be divided by a separator.

By setting the composition of the Key-Value field in the second database in this way, the Value field corresponding to a certain Key field in the table can be searched quickly, and the decoding efficiency can be improved.

In some alternative implementations, a set of pre-compiled request templates can be stored in the first database, and the request templates may correspond to a type of data reading and writing requests. In order to reduce the overhead of SQL statement parsing and expression calculation, the PreparedStatement feature which is completely compatible with the MySQL protocol can be provided at the front end of StarRocks. A PreparedStatement instance includes a compiled SQL statement, for example, a statement "get ready". The SQL statement included in a PreparedStatement object may have one or more IN parameters. A value of the IN parameter is not specified when the SQL statement is created. Instead, this statement reserves a question mark ("?") for each IN parameter as a placeholder. A value of each question mark must be provided by an appropriate setXXX method before the statement is executed. When the PreparedStatement is started at the front end, SQL and its expressions will be calculated in advance and cached in a memory cache, and subsequent queries can be directly carried out by using a cache object.

After receiving the data reading and writing request for the first database, the executing entity can determine whether a pre-compiled request template corresponding to the data reading and writing request is stored in the request template set, and if so, the pre-compiled request template corresponding to the data reading and writing request can be used to process the data reading and writing request, that is, specific parameters in the data reading and writing request can be added to the corresponding request template to obtain a parsed data reading and writing request.

In this way, the cached request template can be directly acquired from the memory to process the request, thus reducing the overhead of SQL statement parsing and expression calculation.

In some alternative implementations, the data reading and writing request may include a data update request. The executing entity may receive a data reading and writing request for the first database in the following ways: if the executing entity determines that at least two data update requests are received, a target data update request can be determined from the at least two data update requests as a data update request for the first database. As an example, the data update request received earlier can be determined as the target data update request, and at this time, prompt information may be sent to the user terminal from which other data update requests other than the target data update request originate.

When inserting and updating data, it is necessary to ensure the eventual consistency of data. When a data conflict phenomenon is encountered, it is necessary to prompt the conflicting data.

Figure 2:
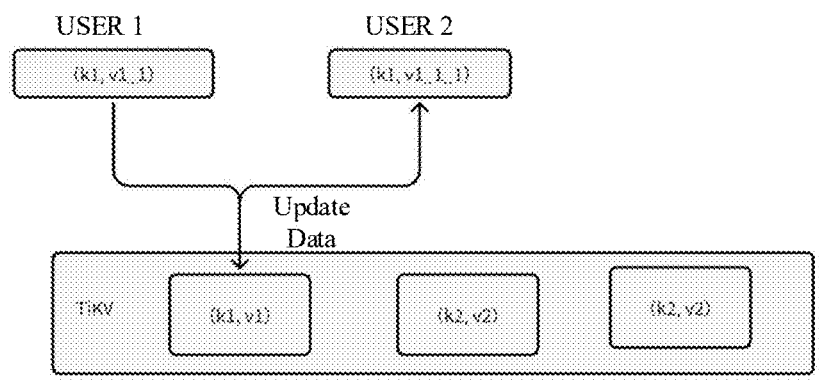
FIG. 2 is a schematic diagram of an application scenario of updating data in the data reading and writing method according to the present disclosure.

As an example, as shown in FIG. 2, FIG. 2 is a schematic diagram of an application scenario of updating data in the data reading and writing method according to this embodiment. In FIG. 2, both a user 1 and a user 2 update a value of k1 in TiKV at the same time, and at this time, only one user is allowed to update successfully, and the other user will be prompted that there is a conflict. Here, since the request received earlier is the request of the user 1, the value of k1 will be updated by the request sent by the user 1, and the data conflict prompt information will be sent to a terminal of the user 2.

Figure 3:
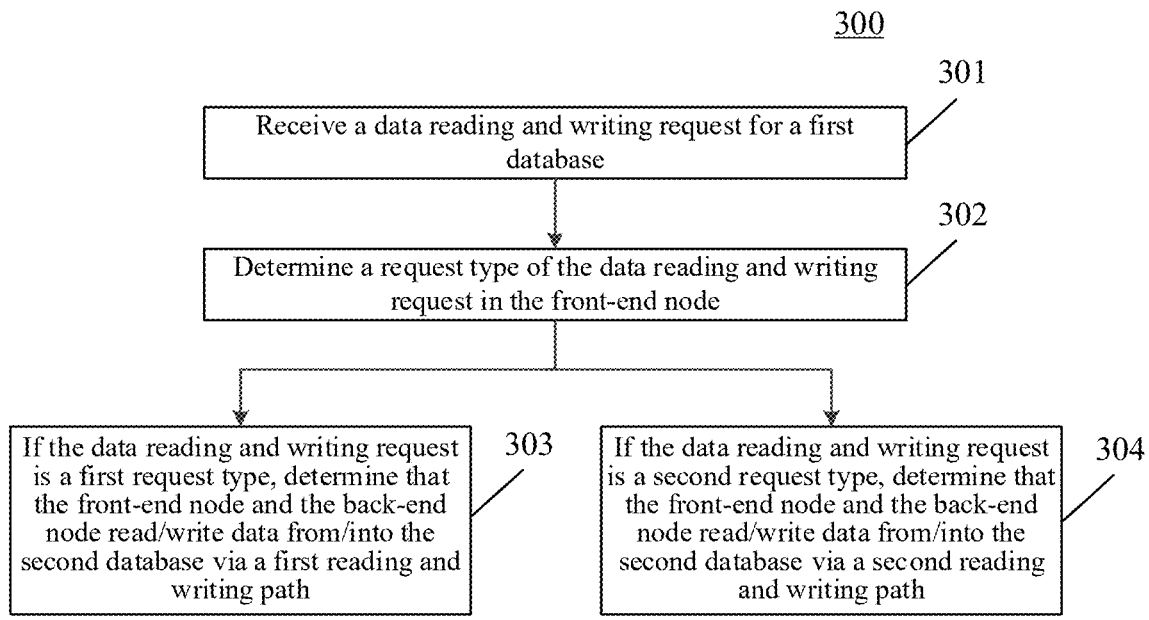
FIG. 3 is a flowchart of another embodiment of a data reading and writing method according to the present disclosure.

With continued reference to FIG. 3, which illustrates a flowchart 300 of another embodiment of a data reading and writing method. The flowchart 300 of the data reading and writing method includes the steps as follows.

In step 301, a data reading and writing request for a first database is received.

In this embodiment, step 301 can be executed in a manner similar to step 101, which is omitted here.

In step 302, a request type of the data reading and writing request is determined in the front-end node.

In this embodiment, the executing entity of the data reading and writing method can determine the request type of the data reading and writing request in the front-end node. The request type of the data reading and writing request can be determined according to the complexity of an operation indicated by the data reading and writing request.

As an example, if the data reading and writing request indicates relatively simple data operations such as data writing, point query, point update, and point deletion, it can be determined that the request type is a first request type. If the data reading and writing request indicates other relatively complicated data operations (for example, an operator with a shuffle operation) other than the simple data operations, it can be determined that the request type is a second request type.

In step 303, if the data reading and writing request is a first request type, it is determined that the front-end node and the back-end node read/write data from/into the second database via a first reading and writing path.

In this embodiment, if it is determined in step 302 that the data reading and writing request is the first request type, the executing entity may determine that the front-end node and the back-end node read/write data from/into the second database by the first reading and writing path.

In step 304, if the data reading and writing request is a second request type, it is determined that the front-end node and the back-end node read/write data from/into the second database via a second reading and writing path.

In this embodiment, if it is determined in step 302 that the data reading and writing request is the second request type, the executing entity may determine that the front-end node and the back-end node read/write data from/into the second database by the second reading and writing path.

It should be noted that the first reading and writing path is usually shorter than the second reading and writing path. Since the data reading and writing operation indicated by the first request type is simpler than that indicated by the second request type, some data processing steps, such as data optimization, can be omitted, and accordingly, the first reading and writing path is usually shorter than the second reading and writing path.

As can be seen from FIG. 3, compared with the embodiment corresponding to FIG. 1, the flow 300 of the data reading and writing method in this embodiment embodies the step of determining whether to read/write data from/into the second database by the first reading and writing path or the second reading and writing path according to the request type of the data reading and writing request. Thus, the solution described in this embodiment performs data reading and writing with the shorter reading and writing path for relatively simple data reading and writing requests, thereby improving the data reading and writing ability and efficiency of row storage.

In some alternative implementations, the first reading and writing path may include: reading/writing data from/into the second database by using a data interface by means of a remote procedure call (RPC). In the RPC, a caller sends a request message to a remote host, and the remote host executes a corresponding program after receiving the request and returns a result to the caller. Here, the first database is usually the caller, the back-end node of the first database is the caller, and the second database is usually the remote host. The first database may send a request message to the second database, and the second database may execute a corresponding program after receiving the request, that is, execute data reading and writing operations, and then the second database may return data reading and writing results to the first database.

In some alternative implementations, the second reading and writing path includes: processing the data reading and writing request by a pipeline link mode. Pipeline is a chain composed of a group of operators. As a start operator of Pipeline, SourceOperator generates data for subsequent operators of Pipeline; and as an end operator, SinkOperator absorbs a calculation result of Pipeline and outputs data. Here, data can be read from the second database by using the start operator SourceOperator and written into the second database by using the end operator SinkOperator.

Figure 4:
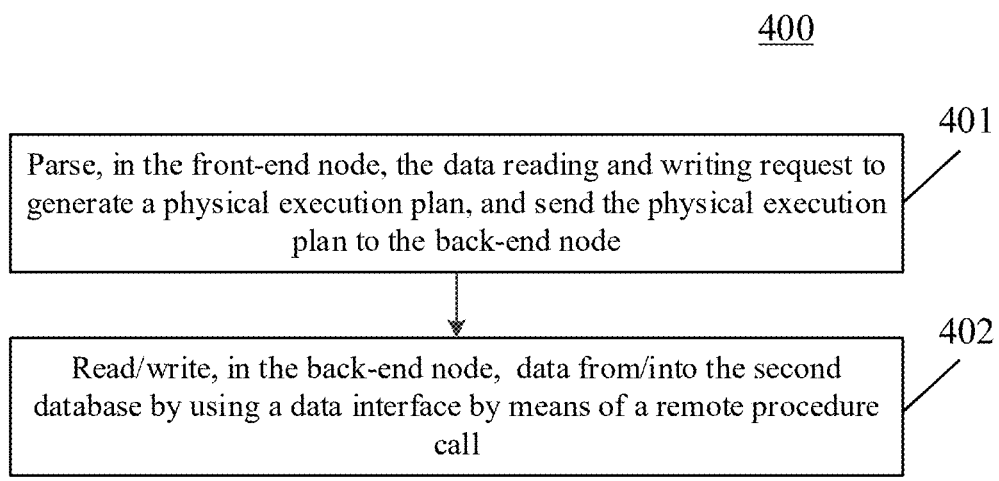
FIG. 4 is a flowchart of one embodiment of a first reading and writing path in the data reading and writing method according to the present disclosure.

With further reference to FIG. 4, which illustrates a flowchart 400 of one embodiment of a second reading and writing path in a data reading and writing method. The flowchart 400 of the first reading and writing path includes the steps as follows.

In step 401, the data reading and writing request is parsed in the front-end node to generate a physical execution plan, and the physical execution plan is sent to the back-end node.

In this embodiment, the first database may be StarRock, and the StarRocks cluster is usually composed of FE and a number of BEs. FE refers to FrontEnd, that is, the front-end node of StarRocks, which is mainly responsible for cluster management of metadata, management of client connections, query analysis planning, generation of a query execution plan, query scheduling (sending queries to the BE for execution) and etc. BE refers to BackEnd, that is, the back-end node of StarRocks, which is mainly responsible for data storage, execution of the query execution plan, copy management and etc. The data of each table is broken up into multiple Tablets according to a shuffle or bucketing mechanism. In order to tolerate the Tablet, multiple copies are made, and these tablets are eventually distributed over different BEs.

In the front-end node of the first database, the data reading and writing request can be parsed to generate a physical execution plan. The physical execution plan is an execution tree composed of physical operators, and SQL statements are processed by parser and analyze stages and the like to eventually generate the physical execution plan. Here, the generated physical execution plan is used for performing a remote procedure call on the second database. The physical execution plan may include but not limited to: calling a region of the data requested to be read/written in the TiKV through the RPC and packaging an execution task that can be identified by the BE.

After that, the front-end node can send the physical execution plan to the back-end node of the first database.

In step 402, in the back-end node, data is read/written from/into the second database by using a data interface by means of a remote procedure call.

In this embodiment, in the back-end node of the first database, the executing entity can read/write data from/into the second database by using the data interface by means of the remote procedure call. Here, the back-end node can send one request message to the second database, and the second database executes the corresponding program after receiving the request, that is, execute data reading and writing operations, and then the second database may return a data reading and writing result to the back-end node.

According to the method provided by the embodiment of the present disclosure, by directly sending simple point operations (e.g., a point query, a point update, etc.) and write operations to a certain BE node through a RPC request without taking the PlanFragment and Pipeline execution links, the QPS (Queries-per-second, query rate per second) of simple queries is increased.

With continued reference to FIG. 5, which shows a flowchart 500 of one embodiment of a second reading and writing path in a data reading and writing method. The flowchart 500 of the first reading and writing path includes the steps as follows.

In step 501, the data reading and writing request is parsed in the front-end node to generate a physical execution plan, the physical execution plan is split into a plurality of plan fragments, a fragment instance is built according to the plurality of plan fragments, and the fragment instance is sent to the back-end node.

In this embodiment, in the front-end node of the first database, the executing entity may parse the data reading and writing request to generate a physical execution plan, split the physical execution plan into a plurality of PlanFragments, build a fragment instance according to the plurality of plan fragments, and send the fragment instance to the back-end node.

Here, the PlanFragment is part of the physical execution plan. Only after the physical execution plan is split into several PlanFragment by the FE, multiple computers can be executed in parallel. PlanFragment is also composed of physical operators, and also includes DataSink. The upstream PlanFragment sends data to an Exchange operator of the downstream PlanFragment through DataSink.

Fragment Instance is an execution instance of PlanFragment. The table of StarRocks is split into several tablets by shuffling and bucketing, and each tablet is stored in the form of multiple copies on the computing node. The PlanFragment can be instantiated into multiple fragments to process tablets distributed on different machines, thus implementing data parallel computing. The FE determines a number of Fragment Instances and a target BE to execute Fragment Instances, and then the FE delivers the fragment instances to the BE.

In a Pipeline execution engine, the PipelineBuilder on the BE will further split the PlanFragment into several Pipelines, and each Pipeline will be instantiated into a set of PipelineDriver according to the Pipeline parallelism parameters. The PipelineDriver is a Pipeline instance and also a basic task that the pipeline execution engine can schedule.

In step 502, in the back-end node, the fragment instance is processed by adopting a pipeline link, data is read from the second database by using the start operator, and data is written into the second database by using the end operator.

In this embodiment, in the back-end node of the first database, the executing entity can employ a pipeline link to process the fragment instance, use the start operator to read data from the second database, and use the end operator to write data into the second database.

Here, the fragment instance is processed by the pipeline link mode. Pipeline is a chain composed of a group of operators. As a start operator of Pipeline, SourceOperator generates data for subsequent operators of Pipeline; and as an end operator, SinkOperator absorbs a calculation result of Pipeline and outputs data. Here, data can be read from the second database by using the start operator SourceOperator and written into the second database by using the end operator SinkOperator.

The method provided by the above embodiment of the present disclosure performs data reading and writing through the pipeline link mode of StarRocks, so that relatively complicated SQL statements can be processed.

With reference to FIG. 6, FIG. 6 is a schematic diagram of the first reading and writing path and the second reading and writing path in the data reading and writing method according to this embodiment. In FIG. 6, for the relatively complicated SQL statement, the SQL statement will be processed by the following second reading and writing path: the front-end node of StarRocks will perform the following operations on the SQL statement: parsing with a parser, analyzing, making a physical execution plan with a planner, optimizing with an optimizer and generating a fragment with a fragmenter; and after receiving the fragment generated by the fragmenter, the back-end node of StarRocks will perform the following operations: fragment execution with a FragmentExector, pipeline building with a PipelineBuilder, pipeline execution with a PipelineExector, generating ThreadPool, ConnectorScan/Datasink.

When StarRocks receives an SQL statement submitted by a client, the SQL statement is converted into an executable physical execution plan after a plurality of flows such as syntax parsing, semantic parsing, optimization rules, and the like of the SQL statement. Although this process is not long, it is indeed a bit long for the demand of high QPS. In fact, there is no need to go through some flows for relatively simple SQL statements (for example, a point query, a point update and writing).

Relatively simple SQL statements can be directly sent to a certain BE node through an RPC request, without taking the PlanFragment and Pipeline execution links, thus increasing the QPS of simple queries. As an example, at the FE, optimizing with the Optimizer and the scheduling of Fragment can be skipped, and the process goes directly through a new RPC link. At the BE, the building and execution of the Pipeline can be skipped, and data is read and written directly through ConnectorScan and returned.

The SQL statement may be processed through the following first reading and writing path: the front-end node of StarRocks will perform the following operations on the SQL statement: parsing with a parser, analyzing, making a physical execution plan with a planner; and after receiving the physical execution plan by the planner, the back-end node of StarRocks will directly read and write data through ConnectorScan.

Figure 7:
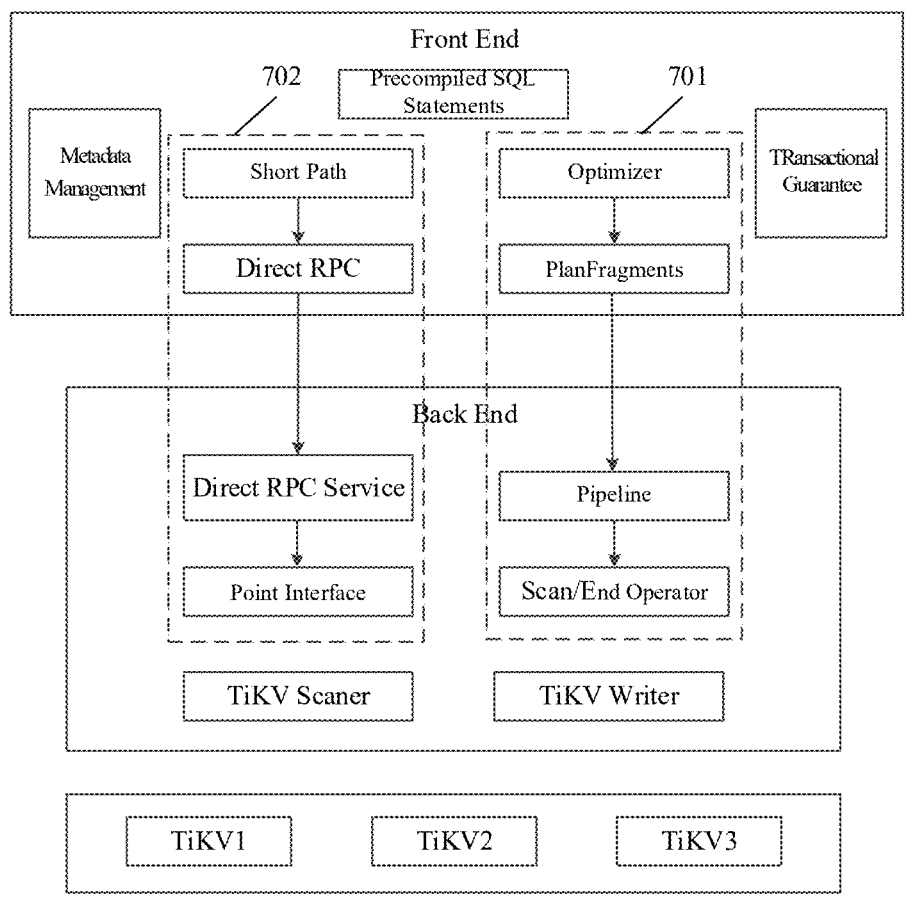
FIG. 7 is a schematic diagram of performing data reading and writing in the data reading and writing method according to the present disclosure.

Further referring to FIG. 7, FIG. 7 is a schematic diagram of performing data reading and writing in the data reading and writing method according to this embodiment. In FIG. 7, the front-end node of StarRocks can store precompiled SQL statements, which can reduce the overhead of SQL statement parsing and expression calculation. The front-end node of StarRocks can carry out transactional guarantee, can guarantee the eventual consistency of data when inserting and updating the data, and prompts conflicting data when encountering a data conflict. In the front-end node of StarRocks, metadata can also be managed and the management of TiKV tables can be implemented, such as column information and statistical information of row storage tables.

In the front-end node of StarRocks, SQL statements can be parsed to generate a physical execution plan, the physical execution plan can be split into PlanFragments, and fragment instances can be built according to the PlanFragments, and handed over to the back-end node of StarRocks for processing.

In an execution process of the front-end node of StarRocks, data can be read and written in two paths according to the class of the SQL statement. One path is a conventional path, in which the Optimizer is used to optimize the SQL statement to obtain an optimal physical execution plan; then the physical execution plan is split into PlanFragment, and a Fragment instance is built according to the PlanFragment; DataSink is employed to send data in the Fragment instance; and after the Fragment instance is built, the front-end node hands it over to the back-end node for processing, as shown in the path by the reference numeral 701.

The other path is a short path, in which after receiving the SQL statement, the front-end node of StarRocks checks whether it conforms to a short-path reading and writing mode, if so, the front-end node skips the optimization rules of the Optimizer and directly employs the RPC, as shown in the path by the reference numeral 702.

In an execution process of the back-end node of StarRocks, when the Fragment instance is received, it will also be divided into two paths, namely, the conventional path and the short path.

The conventional path employs the Pipeline link to process the Fragment instance. The Pipeline link is a chain of operators, with SourceOperator as the start operator and SinkOperator as the end operator. In TikvScanner, the SourceOperator is implemented to acquire data, and TikvWriter implements the SinkOperator to write data, as shown in the path of the reference numeral 701.

The short path converts a task into a new RpcService, implementing a Point interface function. The Point interface function directly operates an interface of a Tikv data source to read and write data, as shown in the path of the reference numeral 702.

The data in Tikv1, Tikv2 and Tikv3 can be read and written through these two paths.

Figure 8:
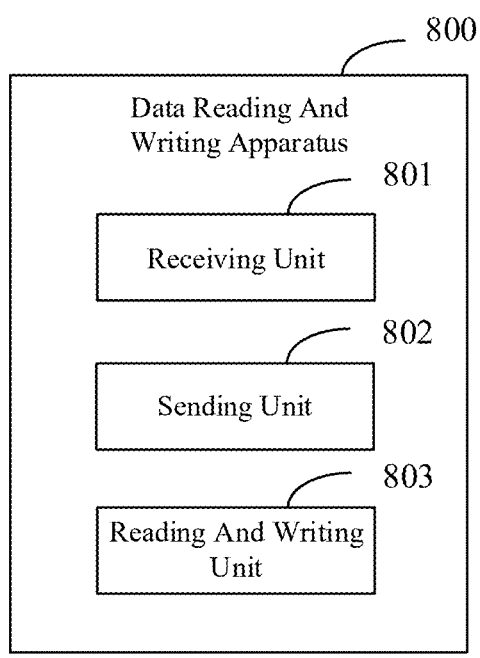
FIG. 8 is a schematic structural diagram of one embodiment of a data reading and writing apparatus according to the present disclosure.

Referring further to FIG. 8, as an implementation of the methods depicted in the figures as described above, the present disclosure provides an embodiment of a data reading and writing apparatus. This apparatus embodiment corresponds to the method embodiment illustrated in FIG. 1 and can be utilized in a variety of electronic devices.

As shown in FIG. 8, the data reading and writing apparatus 800 provided in the present embodiment comprises: a receiving unit 801, a sending unit 802 and a reading and writing unit 803. The receiving unit 801 is configured to receive a data reading and writing request for a first database, where the first database stores data in a column-oriented storage format, the data reading and writing request is used for reading/writing data from/into a row storage table, the first database includes a front-end node and a back-end node, the front-end node is used for receiving the data reading and writing request and the back-end node is used for storing data. The sending unit 802 is configured to parse the data reading and writing request in the front-end node and send a parsing result to the back-end node. The reading and writing unit 803 is configured to read/write data from/into a second database by using the parsing result in the back-end node, where the first database calls data from the second database, and the second database stores data in a row-oriented storage format.

In the present embodiment, the processing performed by the receiving unit 801, the sending unit 802 and the reading and writing unit 803 of the data reading and writing apparatus 800 may be referred to steps 101, 102 and 103 in the embodiment shown in FIG. 1.

In some alternative implementations, the reading and writing unit 803 can parse the data reading and writing request in the following ways. The reading and writing unit 803 may determine a request type of the data reading and writing request, and then determine a reading and writing path for the front-end node and the back-end node to read/write data from/into the second database based on the request type of the data reading and writing request.

In some alternative implementations, the reading and writing unit 803 may further determine the data reading and writing path for the data reading and writing operations on the second database by the front end node and the back end node, based on the type of data reading and writing request, by the following way: if the data reading and writing request is a first request type, it is determined that the front-end node and the back-end node read/write data from/into the second database via a first reading and writing path; and if the data reading and writing request is a second request type, it is determined that the front-end node and the back-end node read/write data from/into the second database via a second reading and writing path.

In some alternative implementations, the first reading and writing path comprises: reading/writing data from/into the second database by using a data interface by means of a remote procedure call.

In some alternative implementations, the second reading and writing path may comprise: reading, by a pipeline link mode, data from second database by using a start operator, and writing data into the second database by using an end operator.

In some alternative implementations, the first database may comprise: a massively parallel processing database, and the second database comprises: a distributed transactional key-value database.

In some alternative implementations, the first reading and writing path may comprise: parsing the data reading and writing request in the front-end node to generate a physical execution plan, and sending the physical execution plan to the back-end node, wherein the physical execution plan is used for performing a remote procedure call on the second database; and reading/writing data from/into the second database by using the data interface by means of the remote procedure call, in the back-end node.

In some alternative implementations, the second reading and writing path comprises: parsing the data reading and writing request in the front-end node to generate a physical execution plan, splitting the physical execution plan into a plurality of plan fragments, building a fragment instance according to the plurality of plan fragments, and sending the fragment instance to the back-end node; and processing, in the back-end node, the fragment instance by using a pipeline link, reading data from the second database by using the start operator, and writing data into the second database by using the end operator.

In some alternative implementations, keys in the second database may comprise at least one of: a fixed prefix, a data fragment identity, an underline and data column data; and a value in the second database comprise at least one of: a version, a column size, a null column size, a null column index array and data column data.

In some alternative implementations, a set of pre-compiled request templates is stored in the first database; and the data reading and writing apparatus 800 may further comprise: a determining unit (not shown) and a processing unit (not shown). The determining unit is configured to determine whether a pre-compiled request template corresponding to the data reading and writing request is stored in the request template set. The processing unit is configured to process, when it is determined that the pre-compiled request template corresponding to the data reading and writing request is stored in the request template set, the data reading and writing request by using the pre-compiled request template corresponding to the data reading and writing request.

In some alternative implementations, the data reading and writing request comprises a data update request; and the receiving unit 801 may be further configured to receive the data reading and writing request for the first database comprises in the following way: determining, in response to receiving at least two data update requests, a target data update request from the at least two data update requests as a data update request for the first database.

Figure 9:
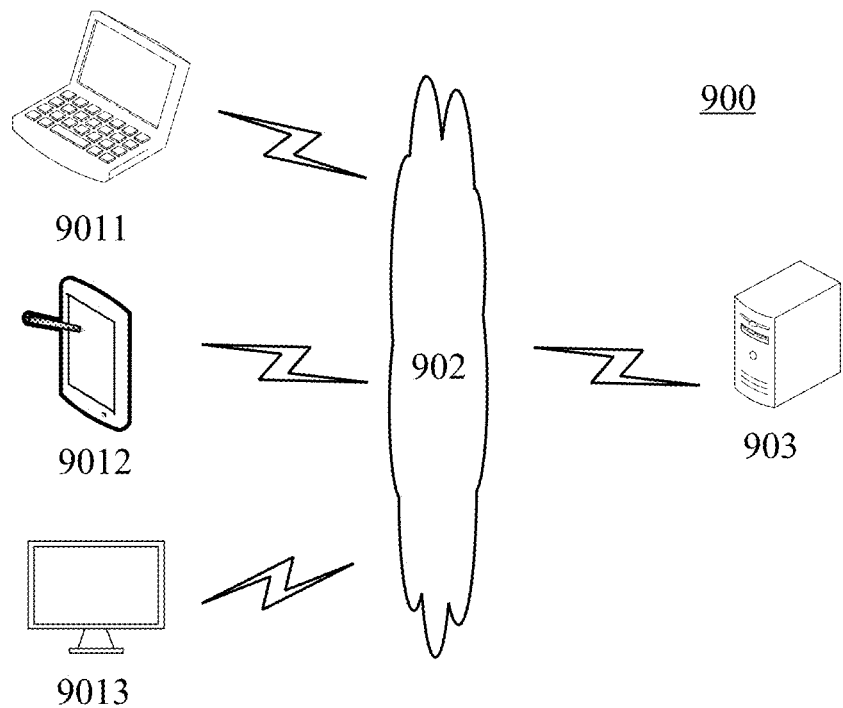
FIG. 9 is a diagram of an exemplary system architecture to which various embodiments of the present disclosure can be applied.

FIG. 9 shows an exemplary system architecture 900 to which an embodiment of the data reading and writing method of the present disclosure can be applied.

As shown in FIG. 9, the system architecture 900 may include terminal devices 9011, 9012 and 9013, a network 902 and a server 903. The network 902 is a medium for providing communication links between the terminal devices 9011, 9012, 9013 and the server 903. The network 902 may include various connection types, such as wired, wireless communication links or fiber optic cables.

The user can use the terminal devices 9011, 9012 and 9013 to interact with the server 903 through the network 902 to send or receive messages, etc. For example, the terminal devices 9011, 9012 and 9013 may send data reading and writing requests to the server 903. The terminal devices 9011, 9012 and 9013 can be installed with various communication client applications, such as short video software and search engines.

The terminal devices 9011, 9012 and 9013 may be hardware or software. When the terminal devices 9011, 9012, and 9013 are hardware, they may be various electronic devices which have display screens and support information interaction, including but not limited to smart phones, tablet computers, laptop computers, and the like. When the terminal devices 9011, 9012 and 9013 are software, they may be installed in the electronic devices listed above. The terminal devices may be implemented as multiple software or software modules (for example, multiple software or software modules to provide distributed services) or as a single software or software module. It is not specifically limited here.

The server 903 may be a server that provides various services. For example, it can be a background server that processes data reading and writing requests. The server 903 can receive a data reading and writing request for a first database that stores data in a column-oriented storage format; then, in the front-end node of the first database, the data reading and writing request is parsed and a parsing result is sent to the back-end node of the first database; then, in the back-end node, the data can be read/written from/into the second database that stores data in a row-oriented storage format by using the parsing result.

It should be noted that the server 903 can be hardware or software. When the server 903 is hardware, it can be implemented as a distributed server cluster composed of multiple servers or as a single server. When the server 903 is software, it can be implemented as multiple software or software modules (for example, to provide distributed services) or as a single software or software module. It is not specifically limited here.

It should also be noted that the data reading and writing method provided by the embodiment of the present disclosure is usually executed by the server 903, and the data reading and writing apparatus is usually provided in the server 903.

It should be understood that the numbers of terminal devices, networks and servers in FIG. 9 are only for illustration. According to implementation needs, there may be any number of terminal devices, networks and servers.

Figure 10:
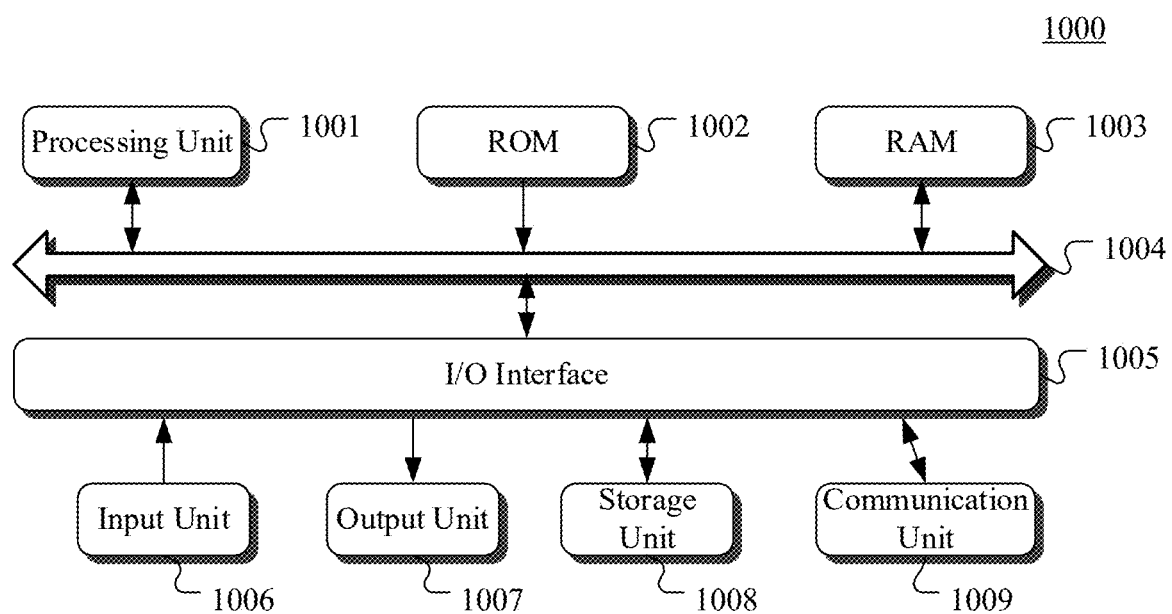
FIG. 10 is a schematic structural diagram of a computer system applicable for implementing an electronic device according to an embodiment of the present disclosure.

Reference is now made to FIG. 10, which shows a structural schematic diagram of an electronic device (e.g., a server in FIG. 9) 1000 suitable for implementing an embodiment of the present disclosure. The server shown in FIG. 10 is just an example, and should not bring any limitation to the functions and use scope of the embodiments of the present disclosure.

As shown in FIG. 10, the electronic device 1000 may include a processing unit (such as, a Central Processing Unit (CPU), a Graphics Processing Unit (GPU), etc.) 1001, which can execute various appropriate actions and processing based on programs stored in the read-only memory (ROM) 1002 or loaded into the random-access memory (RAM) 1003 from the storage unit 1008. Various programs and data required for the operation of the electronic device 1000 are also stored in the RAM 1003. The processing unit 1001, the ROM 1002, and the RAM 1003 are interconnected via the bus 1004. The input/output (I/O) interface 1005 is also connected to the bus 1004.

Typically, the following devices can be connected to the I/O interface 1005: an input unit 1006, which may include, for example, a touch screen, a touchpad, a keyboard, a mouse, a camera, a microphone, an accelerometer, a gyroscope, etc.; an output unit 1007, which may include, for example, a liquid crystal display (LCD), a speaker, a vibrator, etc.; a storage unit 1008, which may include, for example, magnetic tape, a hard disk, etc.; and a communication unit 1009. The communication unit 1009 may allow the electronic device 1000 to communicate wirelessly or via a wired connection with other devices to exchange data. Although FIG. 10 shows an electronic device 1000 with various units, it should be understood that it is not necessary to implement or have all the units as shown. More or fewer units can be implemented. Each box shown in FIG. 10 may represent a single unit or multiple units as needed.

According to the embodiments of the present disclosure, the processes described with reference to the flowcharts can be implemented as computer software programs. For instance, the embodiments of the present disclosure include a computer program product that comprises a computer program borne on a computer-readable medium, wherein the computer program contains program code for performing the methods illustrated in the flowcharts. In such embodiments, the computer program can be downloaded and installed from a network via the communication device 1009, or installed from the storage device 1008, or installed from the ROM 1002. When the computer program is executed by the processing device 1001, it performs the functions defined in the methods of the embodiments of the present disclosure. It should be noted that the computer-readable medium referred to in the embodiments of the present disclosure can be a computer-readable signal medium or a computer-readable storage medium, or any combination thereof. Computer-readable storage media, for example, can include, but not limited to, electrical, magnetic, optical, electromagnetic, infrared, or semiconductor systems, devices, or apparatuses, or any suitable combination thereof. More specific examples of computer-readable storage media can include, but are not limited to, electrical connections having one or more wires, portable computer disks, hard disks, random access memory (RAM), read-only memory (ROM), erasable programmable read-only memory (EPROM or flash memory), optical fiber, portable compact disc read-only memory (CD-ROM), optical storage devices, magnetic storage devices, or any suitable combination thereof. In the embodiments of the present disclosure, a computer-readable storage medium can be any tangible medium that contains or stores a program for use by or in connection with an instruction execution system, device, or apparatus. In the embodiments of the present disclosure, a computer-readable signal medium can include data signals propagated in a baseband or as part of a carrier wave, wherein the data signals carry computer-readable program code. Such propagating data signals can take various forms, including but not limited to electromagnetic signals, optical signals, or any suitable combination thereof. A computer-readable signal medium can also be any computer-readable medium except for a computer-readable storage medium, which can send, propagate, or transmit programs for use by or in connection with an instruction execution system, device, or apparatus. Program code contained on computer-readable media can be transmitted using any appropriate medium, including but not limited to wires, optical cables, RF (radio frequency), or any suitable combination thereof.

According to the data reading and writing method and the electronic device provided by the embodiments of the present disclosure, a data reading and writing request for a first database that stores data in a column-oriented storage format is received, where the first database includes a front-end node and a back-end node; then, in the front-end node, the data reading and writing request is parsed and a parsing result is sent to the back-end node; then, in the back-end node, data can be read/written from/into the second database that stores data in a row-oriented storage format by using the parsing result. In this way, the row-oriented storage capacity can be implemented in the database adopting column-oriented storage, and highly-concurrent point query and high-frequency updating capacities can be met.

The computer-readable medium described above may be included in the electronic device; or it may exist alone without being assembled into the electronic device. The above computer-readable medium carries one or more programs. When the one or more programs are executed by the electronic device, it enables the device to: receive a data reading and writing request for the first database, where the first database stores data in a columnar storage format, and the data reading and writing request is intended for reading and writing data in a row storage table. The first database consists of a front-end node and a back-end node, with the front-end node serving to receive data reading and writing requests, and the back-end node serving to store data. Within the front-end node, the data reading and writing request is parsed, and the parsing result is sent to the back-end node. In the back-end node, the parsing result is employed to conduct data reading and writing operations in the second database, wherein the first database calls data from the second database, which stores data in a row storage format.

Computer program code for executing the operations of the embodiments of this disclosure can be written in one or more programming languages or combinations thereof. These languages may include object-oriented programming languages such as Java, Smalltalk, C++, and conventional procedural programming languages such as the "C" language or similar programming languages. The program code can run entirely on a user's computer, partially on the user's computer, as a standalone software package, partially on the user's computer and partially on a remote computer, or entirely on a remote computer or server. In scenarios involving remote computers, the remote computer can be connected to the user's computer through any kind of network, including a Local Area Network (LAN) or a Wide Area Network (WAN), or it can connect to an external computer (for example, using an Internet Service Provider to connect to the Internet).

The flowcharts and block diagrams in the drawings depict the architecture, functionality, and operation of potential implementations of systems, methods, and computer program products according to various embodiments of the present disclosure. In this context, each block in the flowchart or block diagram may represent a module, segment, or portion of code containing one or more executable instructions for implementing the specified logical function(s). It should also be noted that, in some alternative implementations, the functions noted in the blocks may occur in an order different from that noted in the figures. For instance, two blocks shown in sequence may, in fact, be executed substantially concurrently, or the blocks may sometimes be executed in reverse order, depending on the involved functionality. It should also be noted that each block in the block diagrams and/or flowchart illustrations, and combinations of blocks in the block diagrams and/or flowchart illustrations, can be implemented by specialized hardware-based systems that perform the specified functions or acts, or combinations of specialized hardware and computer instructions.

The units involved in the embodiments described in the present disclosure may be implemented by software or hardware. The described unit can also be provided in the processor, for example, it can be described as: a processor includes a receiving unit and a reading and writing unit. Names of these units do not constitute the limitation of the units themselves in some cases. For example, the receiving unit can also be described as "a unit that receives the data reading and writing request for the first database".

The foregoing description is only exemplary of the preferred embodiments of the present disclosure and is illustrative of the principles of the technology employed. It will be appreciated by those skilled in the art that the scope of the present disclosure in the embodiments of the present disclosure is not limited to the specific combinations of the above-mentioned features, and also encompass other embodiments in which the above-mentioned features or their equivalents are combined arbitrarily without departing from the spirit of the present disclosure. For example, the above-mentioned features are replaced with (but not limited to) technical features with similar functions disclosed in the embodiments of the present disclosure.

The invention claimed is:

1. A method of implementing row-oriented data storage by a column-oriented storage database, comprising:
   receiving a data reading and writing request by a first database, wherein the first database stores data in a column-oriented storage format, the data reading and writing request is configured to request for reading/writing data from/into a row storage table, the first database comprises a front-end node and a back-end node, the front-end node is configured to receive the data reading and writing request, and the back-end node is configured to store data;
   generating, by the front-end node, a physical execution plan based on the data reading and writing request, wherein the physical execution plan comprises physical operators;
   reading/writing data from/into a second database by the back-end node based on the physical execution plan, wherein the first database calls data from the second database, and the second database stores data in a row-oriented storage format;
   wherein the method further comprises:
   determining a request type of the data reading and writing request; and
   determining a reading and writing path for the front-end node and the back-end node to read/write data from/into the second database based on the request type of the data reading and writing request, wherein the determining a reading and writing path for the front-end node and the back-end node to read/write data from/into the second database based on the request type of the data reading and writing request comprises:
   determining, when the data reading and writing request is a first request type, that the front-end node and the back-end node read/write data from/into the second database via a first reading and writing path, and
   determining, when the data reading and writing request is a second request type, that the front-end node and the back-end node read/write data from/into the second database via a second reading and writing path, wherein the first reading and writing path is shorter than the second reading and writing path.

2. The method according to claim 1, wherein the first reading and writing path comprises:
   reading/writing data from/into the second database by using a data interface by means of a remote procedure call.

3. The method according to claim 1, wherein the second reading and writing path comprises:
   reading, by a pipeline link mode, data from second database by using a start operator, and writing data into the second database by using an end operator.

4. The method according to claim 1, wherein the first database comprises a massively parallel processing database, and wherein the second database comprises a distributed transactional key-value database.

5. The method according to claim 4, further comprising:
   parsing the data reading and writing request in the front-end node to generate the physical execution plan, and sending the physical execution plan to the back-end node, wherein the physical execution plan is used for performing a remote procedure call on the second database; and
   reading/writing data from/into the second database by using the data interface by means of the remote procedure call, in the back-end node.

6. The method according to claim 4, further comprising:
   parsing the data reading and writing request in the front-end node to generate the physical execution plan, splitting the physical execution plan into a plurality of plan fragments, building a fragment instance according to the plurality of plan fragments, and sending the fragment instance to the back-end node; and
   processing, in the back-end node, the fragment instance by using a pipeline link, reading data from the second database by using the start operator, and writing data into the second database by using the end operator.

7. The method according to claim 1, wherein keys in the second database comprise at least one of: a fixed prefix, a data fragment identity, an underline or data column data; and wherein a value in the second database comprise at least one of: a version, a column size, a null column size, a null column index array or data column data.

8. The method according to claim 1, wherein a set of pre-compiled request templates is stored in the first database; and wherein after the receiving the data reading and writing request by the first database, the method further comprises:
   determining whether a pre-compiled request template corresponding to the data reading and writing request is stored in the request template set;
   processing, in response to determining that the pre-compiled request template corresponding to the data reading and writing request is stored in the request template set, the data reading and writing request by using the pre-compiled request template corresponding to the data reading and writing request.

9. The method according to claim 1, wherein the data reading and writing request comprises a data update request; and wherein the receiving the data reading and writing request by the first database comprises:
   determining, in response to receiving at least two data update requests, a target data update request from the at least two data update requests as a data update request for the first database.

10. An electronic device of implementing row-oriented data storage by a column-oriented storage database, comprising:
    one or more processors; and a memory with one or more programs stored thereon, wherein the one or more programs, when executed by the one or more processors, cause the one or more processors to:
    receive a data reading and writing request by a first database, wherein the first database stores data in a column-oriented storage format, the data reading and writing request is configured to request for reading/writing data from/into a row storage table, the first database comprises a front-end node and a back-end node, the front-end node is configured to receive the data reading and writing request, and the back-end node is configured to implement store data;

generate, by the front-end node, a physical execution plan based on the data reading and writing request, wherein the physical execution plan comprises physical operators;

read/write data from/into a second database by the back-end node based on the physical execution plan, wherein the first database calls data from the second database, and the second database stores data in a row-oriented storage format;

wherein the one or more programs, when executed by the one or more processors, further cause the one or more processors to:

determine a request type of the data reading and writing request;

determine a reading and writing path for the front-end node and the back-end node to read/write data from/into the second database based on the request type of the data reading and writing request;

determine, when the data reading and writing request is a first request type, that the front-end node and the back-end node read/write data from/into the second database via a first reading and writing path; and determine, when the data reading and writing request is a second request type, that the front-end node and the back-end node read/write data from/into the second database via a second reading and writing path, wherein the first reading and writing path is shorter than the second reading and writing path.

11. The electronic device according to claim 10, wherein the first reading and writing path comprises:

reading/writing data from/into the second database by using a data interface by means of a remote procedure call.

12. The electronic device according to claim 10, wherein the second reading and writing path comprises:

reading, by a pipeline link mode, data from second database by using a start operator, and writing data into the second database by using an end operator.

13. The electronic device according to claim 10, wherein the first database comprises a massively parallel processing database, and wherein the second database comprises a distributed transactional key-value database.

14. The electronic device according to claim 13, wherein the one or more programs, when executed by the one or more processors, further cause the one or more processors to:

parsing the data reading and writing request in the front-end node to generate the physical execution plan, and sending the physical execution plan to the back-end node, wherein the physical execution plan is used for performing a remote procedure call on the second database; and reading/writing data from/into the second database by using the data interface by means of the remote procedure call, in the back-end node.

15. The electronic device according to claim 13, wherein the one or more programs, when executed by the one or more processors, further cause the one or more processors to:

parsing the data reading and writing request in the front-end node to generate the physical execution plan, splitting the physical execution plan into a plurality of plan fragments, building a fragment instance according to the plurality of plan fragments, and sending the fragment instance to the back-end node; and processing, in the back-end node, the fragment instance by using a pipeline link, reading data from the second database by using the start operator, and writing data into the second database by using the end operator.

16. A non-transitory computer-readable medium having stored thereon a computer program which, when executed by a processor, cause the processor to:

receive a data reading and writing request by a first database, wherein the first database stores data in a column-oriented storage format, the data reading and writing request is configured to request for reading/writing data from/into a row storage table, the first database comprises a front-end node and a back-end node, the front-end node is configured to receive the data reading and writing request, and the back-end node is configured to store data;

generate, by the front-end node, a physical execution plan based on the data reading and writing request, wherein the physical execution plan comprises physical operators;

read/write data from/into a second database by the back-end node based on the physical execution plan, wherein the first database calls data from the second database, and the second database stores data in a row-oriented storage format;

wherein the computer program, when executed by the processor, further cause the processor to:

determine a request type of the data reading and writing request;

determine a reading and writing path for the front-end node and the back-end node to read/write data from/into the second database based on the request type of the data reading and writing request;

determine, when the data reading and writing request is a first request type, that the front-end node and the back-end node read/write data from/into the second database via a first reading and writing path; and determine, when the data reading and writing request is a second request type, that the front-end node and the back-end node read/write data from/into the second database via a second reading and writing path, wherein the first reading and writing path is shorter than the second reading and writing path.

17. The non-transitory computer-readable medium according to claim 16, wherein the first reading and writing path comprises:

reading/writing data from/into the second database by using a data interface by means of a remote procedure call.

18. The non-transitory computer-readable medium according to claim 16, wherein the second reading and writing path comprises:

reading, by a pipeline link mode, data from second database by using a start operator, and writing data into the second database by using an end operator.

19. The non-transitory computer-readable medium according to claim 16, wherein the first database comprises a massively parallel processing database, and wherein the second database comprises a distributed transactional key-value database.

20. The non-transitory computer-readable medium according to claim 16, wherein a set of pre-compiled request templates is stored in the first database, and wherein after the receiving the data reading and writing request by the first database, the computer program, when executed by the processor, further cause the processor to:
- determine whether a pre-compiled request template corresponding to the data reading and writing request is stored in the request template set;
- process, in response to determining that the pre-compiled request template corresponding to the data reading and writing request is stored in the request template set, the data reading and writing request by using the pre-compiled request template corresponding to the data reading and writing request.

* * * * *